UNITED STATES PATENT OFFICE.

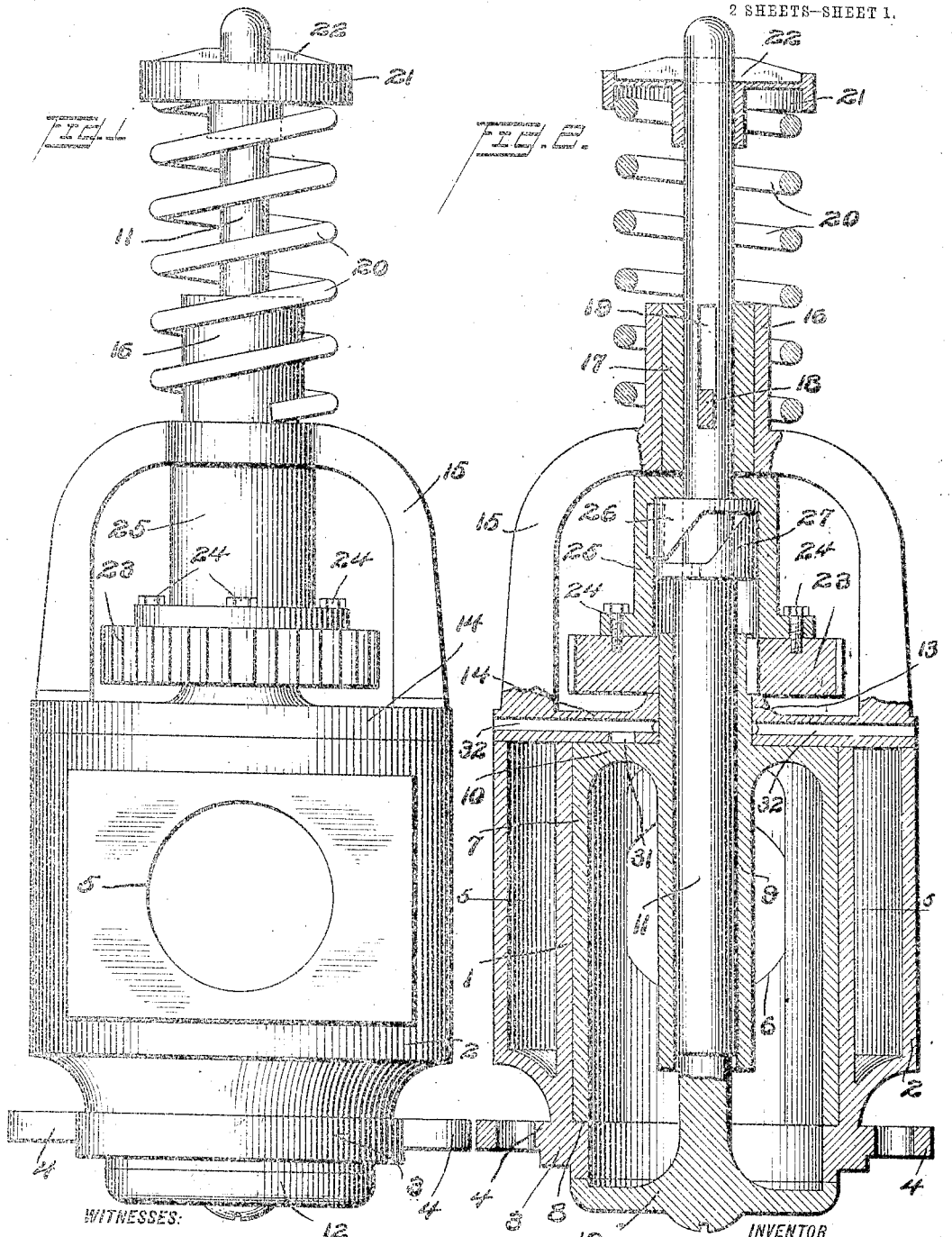

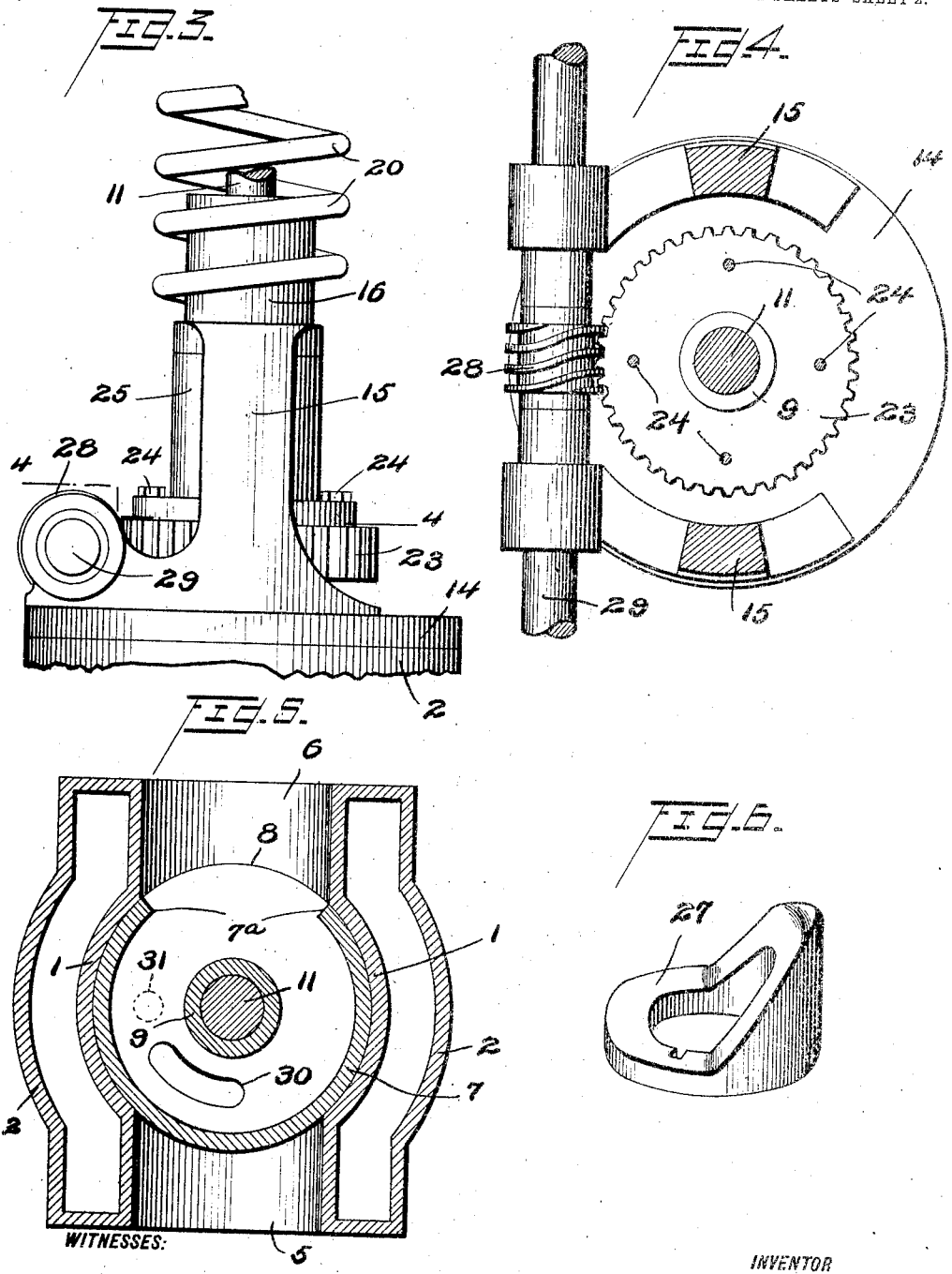

HARRY G. STARK, OF PHILADELPHIA, PENNSYLVANIA.

VALVE FOR INTERNAL-COMBUSTION ENGINES.

1,100,159. Specification of Letters Patent. Patented June 16, 1914.

Application filed May 7, 1913. Serial No. 766,025.

*To all whom it may concern:*

Be it known that I, HARRY G. STARK, a citizen of the United States, residing at Philadelphia, in the county of Philadelphia and State of Pennsylvania, have invented certain new and useful Improvements in Valves for Internal-Combustion Engines, of which the following is a specification.

My invention relates to improvements in valves for internal combustion engines, the object of the invention being to provide a continuously revolving valve coöperating with an intermittently reciprocating valve whereby through a single port in the engine cylinder, the inlet and exhaust may take place.

A further object is to provide in a valve casing, a continuously revolving cylindrical valve having a port therein adapted to communicate with an inlet and an exhaust port in the valve casing, and provide an improved tappet valve normally spring-pressed into closed position at the inner end of the valve casing and operated to open and remain open during the exhaust and suction strokes of the engine piston.

A further object is to provide an improved arrangement of coöperating continuously revolving and intermittently reciprocating valves which nicely time the opening and closing of the inlet and exhaust to permit the efficient operation of an explosive engine of the four-cycle type.

With these and other objects in view, the invention consists in certain novel features of construction, and combinations and arrangements of parts, as will be more fully hereinafter described and pointed out in the claims.

In the accompanying drawings: Figure 1 is a view in side elevation illustrating my improvements. Fig. 2 is a view in longitudinal section. Fig. 3 is a fragmentary view in side elevation at right angles to Fig. 1. Fig. 4 is a view in cross section on the line 4—4 of Fig. 3. Fig. 5 is a view in horizontal section on the line 5—5 of Fig. 2, and Fig. 6 is a perspective view of cam 27.

1 represents a cylindrical valve casing having a suitable water jacket 2 and provided at its end with an integral flange 3 adapted to be secured within an opening in an engine cylinder when securing devices (not shown) are projected through perforated ears 4 integral with said body and secured to the engine cylinder.

The valve casing 1 is provided in opposite sides with inlet and exhaust ports 5 and 6 respectively adapted to be connected with any suitable manifolds (not shown) and the opening and closing of these ports is controlled by a rotary cylindrical valve 7 which fits within the valve casing 1, and at one end engages an annular shoulder 8 within the valve casing. Valve 7 is provided in its wall with an opening or port 7ª which is of a width corresponding to one-fourth of the circumference of the valve, and the ports 5 and 6 are equal in diameter to the width of this opening or port 7ª. The valve 7 is provided centrally with a longitudinal integral sleeve 9 which extends above and below the closed end 10 of said valve, and acts as a guide for the stem 11 of a reciprocating tappet valve 12, the latter closing the end of the valve casing as clearly shown in Fig. 2.

The sleeve 9 beyond the closed end 10 of valve 7 projects through a central opening 13 in a head 14 secured to the end of casing 1. A yoke 15 is provided on the head 14 and has a sleeve 16 in which a bearing 17 is located and through this bearing the end of stem 10 projects.

A key 18 projects through the sleeve 16 and bearing 17 and through a slot 19 in the stem 11 to permit a reciprocating movement of the stem, but prevent any rotary movement thereof, and a coiled spring 20 is located around the stem 10 and the sleeve 16, and bears at one end against the yoke 15, while the other end of said spring exerts an outward pressure against a spring seat 21 held on the stem by means of a cross key 22, so that a continuous spring pressure is had upon the tappet valve 12, tending to close the same.

A worm wheel 23 is keyed to turn with the end of sleeve 9 projecting beyond head 14, and has secured thereto by screws 24, a cylindrical housing 25. A cam 26 is keyed to the housing and turns freely on stem 11. This cam 26 engages a cam 27 keyed to stem 11, so that the continuous rotary movement of wheel 23 and cam 26 imparts an intermittent reciprocating movement to stem 11.

The cams 26 and 27 are precisely alike except that they are reversely positioned. Cam 27 is shown in perspective in Fig. 6, and it will be observed that the cam surface extends half way around the stem, so that valve 12 is open during one half of each revolution of wheel 23 and closed during the remaining half of said revolution as will be more fully hereinafter explained.

Wheel 23 is continuously revolved by a worm 28 on a shaft 29. This shaft 29 may be driven by, or itself constitute, the time shaft which it is to be understood is geared in two to one ratio with the drive shaft of the engine, so that it requires two complete revolutions of the drive shaft to impart a single complete revolution to wheel 23 and valve 7.

To prevent any possibility of explosion within the valve casing during the compression and firing strokes of the engine piston, I provide a curved slot 30 in the end 10 of valve 7 which slot during this operation of the valve, registers with a port 31 in head 14. This port 31 communicates with a passage 32 which is always open to the outside air, and hence prevents any confining of the explosive mixture within the valve casing during this time The length of the slot controls the time of open communication with the outside air, and I have illustrated this slot of sufficient length to maintain the open communication during any time of danger which is the latter part of the compression stroke, and the beginning of the firing stroke of the engine piston.

The valves in Figs. 2 and 5 are illustrated in the position they assume during the compression stroke of the engine.

The operation is as follows: As the suction stroke begins, valve 12 is wide open and valve 7 is beginning to open inlet 5 and continues to open or rather increase the size of this opening during the suction stroke of the engine piston. During this suction stroke, valve 12 begins to close and when the suction stroke is completed, valve 12 is entirely closed, while valve 7 is wide open to the inlet. On the compression stroke, valve 12 remains closed and valve 7 moves to entirely close both the inlet and the exhaust ports 5 and 6. During the firing stroke, valve 12 remains closed, while valve 7 begins to open the exhaust port 6, so that instantly the exhaust stroke begins, the exhaust 6 will be wide open through valve 7. As the piston nears the completion of the firing stroke and is about to begin the exhaust stroke, valve 12 will open, so that the exploded gases may be freely forced out through exhaust port 6. During the exhaust stroke, valve 7 is turning to gradually close the exhaust port, so that by the time the exhaust stroke is completed, the exhaust 6 will be entirely closed, and the valve 7 revolved far enough to begin the opening of the inlet port as above set forth. The rotary valve 7 and the reciprocating valve 12 therefore operate so as to control the inlet and exhaust.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a casing adapted at one end to communicate with an engine cylinder and having inlet and exhaust ports in opposite sides thereof, of a hollow rotary valve in the casing having a port adapted to register with the casing ports, said valve having a closed end and an open end, a valve controlling the communication of the open end of the rotary valve and casing with the engine, and said rotary valve and casing having air passages adapted to register during a portion of the movement of the rotary valve, substantially as described.

2. The combination with a casing adapted at one end to communicate with an engine cylinder and having inlet and exhaust ports in opposite sides thereof, of a hollow rotary valve in the casing having a port adapted to register with the casing ports, said valve having a closed end and an open end, a valve controlling the communication of the open end of the rotary valve and casing with the engine, said casing having an air passage in its closed end, and said rotary valve having a slot in its closed end adapted to register with said passage during a portion of the movement of the rotary valve, substantially as described.

3. The combination with a cylindrical valve casing having inlet and exhaust ports, of a cylindrical rotary valve fitting within the casing and having a port therein adapted to successively open and close the said casing ports, a reciprocating valve spring held in normal closed position against the end of the casing, means for imparting a movement to the rotary valve, means for opening the reciprocating valve when the port in the rotary valve registers with the ports in the casing, and said casing and cylindrical valve having air inlet openings therein adapted to register during a portion of the movement of the rotary valve, substantially as described.

4. The combination with a cylindrical valve casing having inlet and exhaust ports, of a cylindrical rotary valve fitting within the casing and having a port therein adapted to successively open and close the said casing ports, a reciprocating valve spring held in normal closed position against the end of the casing, means for imparting a movement to the rotary valve, means for opening the reciprocating valve when the port in the rotary valve registers with the ports in the casing, said cylindrical valve having a closed end with a curved slot therein concentric with the axis of the valve, and said casing having an air passage in its end adapted to communicate with the slot during a portion of the movement of the rotary valve, substantially as described.

5. The combination with a cylindrical valve casing having inlet and exhaust ports therein, and having an open end adapted to communicate with an engine cylinder, and a spring held valve controlling the open end of the casing, of a cylindrical rotary valve in the casing having a closed end adjacent the closed end of the casing, and an open end adjacent the open end of the casing, said valve having a port therein adapted to alternately register with the inlet and exhaust valves, and said rotary valve and casing constructed to permit communication of the interior of the rotary valve with the outside air during a portion of the movement of the rotary valve, substantially as described.

6. The combination with a cylindrical valve casing having inlet and exhaust ports in opposite sides, a cylindrical rotary valve fitting within the casing and having a port therein extending one-fourth around the circumference of the valve and adapted to successively open and close the said ports, a reciprocating valve spring held in normal closed position against the end of the casing, a stem on said last-mentioned valve projecting through the cylindrical valve, a driving wheel secured to the cylindrical valve, a housing on said driving wheel, a cam keyed to the housing, a second cam keyed to the stem within the housing and operated by the first-mentioned cam, a head on the casing having an air passage therethrough, and a port communicating with the air passage, and said cylindrical valve having a slot adapted to register with said last-mentioned port during a part of the revolution of said cylinder valve, substantially as described.

In testimony whereof I have signed my name to this specification in the presence of two subscribing witnesses.

HARRY G. STARK

Witnesses:
MARY E. DITTUS,
CHAS. E. POTTS.